United States Patent [19]

Katahira

[11] Patent Number: 5,251,501
[45] Date of Patent: Oct. 12, 1993

[54] INTERMEDIATE SUPPORT DEVICE FOR SCREW SHAFT
[75] Inventor: Masayuki Katahira, Gunma, Japan
[73] Assignee: NSK Ltd., Tokyo, Japan
[21] Appl. No.: 953,225
[22] Filed: Sep. 30, 1992
[30] Foreign Application Priority Data
  Sep. 30, 1991 [JP] Japan .............................. 3-079208[U]
[51] Int. Cl.$^5$ .............................................. B23Q 5/40
[52] U.S. Cl. .................... 74/89.15; 248/657; 108/143; 108/20
[58] Field of Search ........................ 74/479 PH, 89.15; 108/143, 20; 248/657, 656, 913

[56] References Cited
U.S. PATENT DOCUMENTS 3,802,281 4/1974 Clarke ................................. 74/89.15
4,149,430 4/1979 F'Geppert ...................... 74/89.15 X
4,372,223 2/1983 Iwatani ................................. 108/143

FOREIGN PATENT DOCUMENTS 2-4737 1/1990 Japan .
4-39453 2/1992 Japan ................... 74/89.15

Primary Examiner—Allan D. Herrmann
Assistant Examiner—William O. Trousdell
Attorney, Agent, or Firm—Sughrue, Mion, Zinn, Macpeak & Seas

[57] ABSTRACT

There is disclosed an intermediate support device which can be moved in a controlled manner in a direction of movement of a table of a table feed apparatus. The intermediate support device includes a nut threadedly engaged with a screw shaft rotatably supported at opposite ends thereof, a slider of a linear guide device disposed parallel to the nut, a connecting member which interconnects the slider and the nut, and rotatably supports the nut through a rolling bearing, and a brake device mounted on the connecting member so as to restrain the rotation of the nut. The brake device is turned on to allow the free rotation of the nut, and is turned off to lock the nut on the connecting member, thereby controlling the movement of the nut, so that the screw shaft is supported at an optimal portion thereof to thereby increasing the natural frequency of the screw shaft.

6 Claims, 3 Drawing Sheets

INTERMEDIATE SUPPORT DEVICE FOR SCREW SHAFT

BACKGROUND OF THE INVENTION

This invention relates to an improved intermediate support device for supporting an intermediate portion of a feed screw shaft in order to avoid a critical speed of the feed screw of a long support span used, for example, in a high-speed table feed device.

During a high-speed feed of a table, such as a mounter in a machine tool or a semiconductor producing apparatus, by a table feed device provided with a feed screw shaft, when the cycle of rotation of the screw shaft coincides with the natural frequency of the screw shaft, a resonance occurs, and this is dangerous. This critical speed is inversely proportional to the square of the distance between support points of the screw shaft, and therefore in the case where the table stroke is long, the support span of the screw shaft is long, so that the critical speed is abruptly lowered. With a higher feed speed, a higher rotational speed of the feed screw has been used, and in some cases a critical speed range has been used. In such a case, it is known to provide an intermediate support device to shorten the support span of the screw shaft to increase the natural frequency.

One conventional intermediate support device of this type is disclosed, for example, in Japanese Laid-Open Utility Model Application No. 2-4737 proposed earlier by the Applicant of the present application. In this device, a nut (which is mounted integrally on a table) is threadedly engaged with a screw shaft rotatably supported at opposite ends thereof by bearings. A pair of front and rear intermediate supports, having two feed screw support portions (slide bearings) which are movable in the direction of the axis of the screw shaft and receive the radial load of the screw shaft, are provided respectively on the opposite sides (front and rear sides) of the nut in the direction of the axis of the nut, and are connected together by a connecting rod. A pair of linear guide device are provided respectively on the opposite (right and left) sides of the screw shaft in parallel relation, and the table is supported by sliders movable along guide rails of the linear guide devices, and the intermediate supports are also supported by other sliders movable along the common guide rails.

A nut which is moved by the rotation of the feed screw is disposed between the feed screw support portions of the pair of intermediate supports. For feeding the table, the nut is first moved in the feed direction by a distance equal to the distance between the intermediate supports, so that the nut is abutted against one of the intermediate supports, and the two interconnected intermediate supports are pushed and moved in unison by this nut.

For returning the table, the nut is moved in the opposite direction by a distance equal to the distance between the intermediate supports, so that the nut is abutted against the other intermediate support, and then is moved, together with the two intermediate supports, to a stop position.

For stopping the nut, one intermediate support is engaged with a limit switch, provided at the end thereof, to operate this switch to stop a rotation drive device, thereby stopping the nut. When the rotation drive device is stopped, the rotation of the screw shaft is stopped. The nut, the table and the intermediate supports are stopped simultaneously when the rotation of the screw shaft is stopped.

In the above conventional example, however, one of the intermediate supports is abutted against the nut, so that the nut is moved together with the intermediate supports. Therefore, there has been encountered a problem that the high-speed movement of the table is prevented by the intermediate supports, so that the speed of movement is slow.

SUMMARY OF THE INVENTION

It is therefore an object of this invention to provide an intermediate support device which can be moved in a controlled manner in a direction of movement of a table, thereby solving the problem of the above prior art.

According to the present invention, there is provided an intermediate support device for a screw shaft comprising a nut threadedly engaged with a screw shaft rotatably supported at opposite ends thereof; a slider of a linear guide device disposed parallel to said nut; a connecting member interconnecting said slider and said nut, said connecting member rotatably supporting said nut through a rolling bearing; and a brake device mounted on said connecting member so as to restrain the rotation of said nut.

When the screw shaft is rotated in an inoperative condition of the brake device, the nut supported through the rolling bearing rotates together with the screw shaft. The rolling bearing idles to cause the rotation of the screw shaft to escape. Therefore, the intermediate support device is not moved in the axial direction, and remains stopped at an arbitrary position. On the other hand, when the brake device is operated, the nut is fixed relative to the connecting member, so that its rotation is prevented. Therefore, in this brake-operated condition, in accordance with the rotation of the screw shaft, the intermediate support device is guided by the linear guide device through the slider, disposed parallel to the intermediate support device, and is moved in the axial direction.

By controlling the operation of the brake device in accordance with the rotation of the screw shaft, the intermediate support device can be moved to an arbitrary position on the screw shaft, independently of the movement of the table of the table apparatus.

In this manner, the intermediate support device is stopped at an optimal position between the end of the screw shaft and a nut, thereby dividing the long support span of the screw shaft to increase the natural frequency to increase the critical speed.

DESCRIPTION OF THE PREFERRED EMBODIMENT

A preferred embodiment of the present invention will now be described with reference to the drawings.

Figure 1:
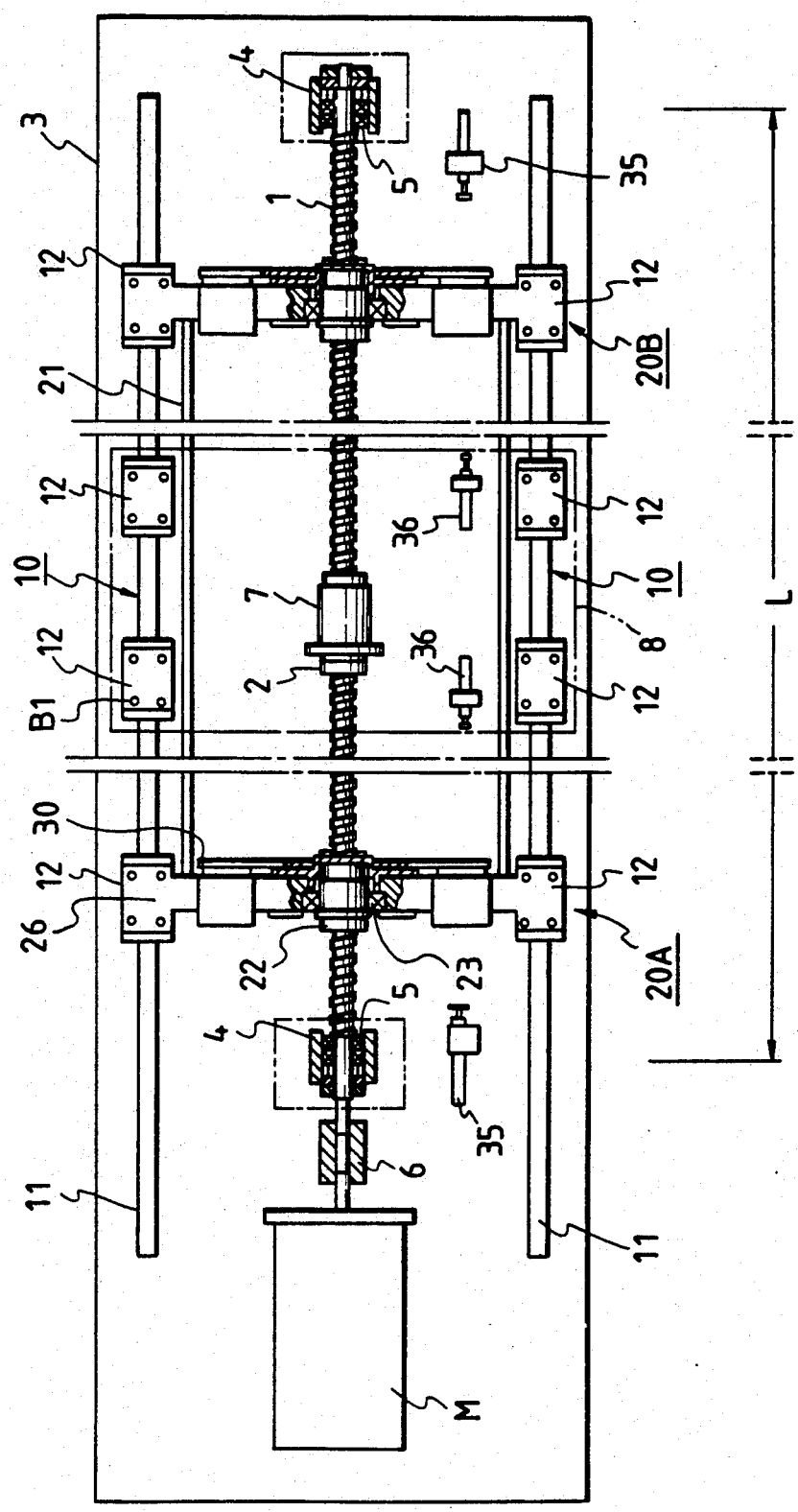
FIG. 1 is a plan view of a table feed apparatus equipped with an intermediate support device for a screw shaft provided in accordance with the present invention.
Figure 2:
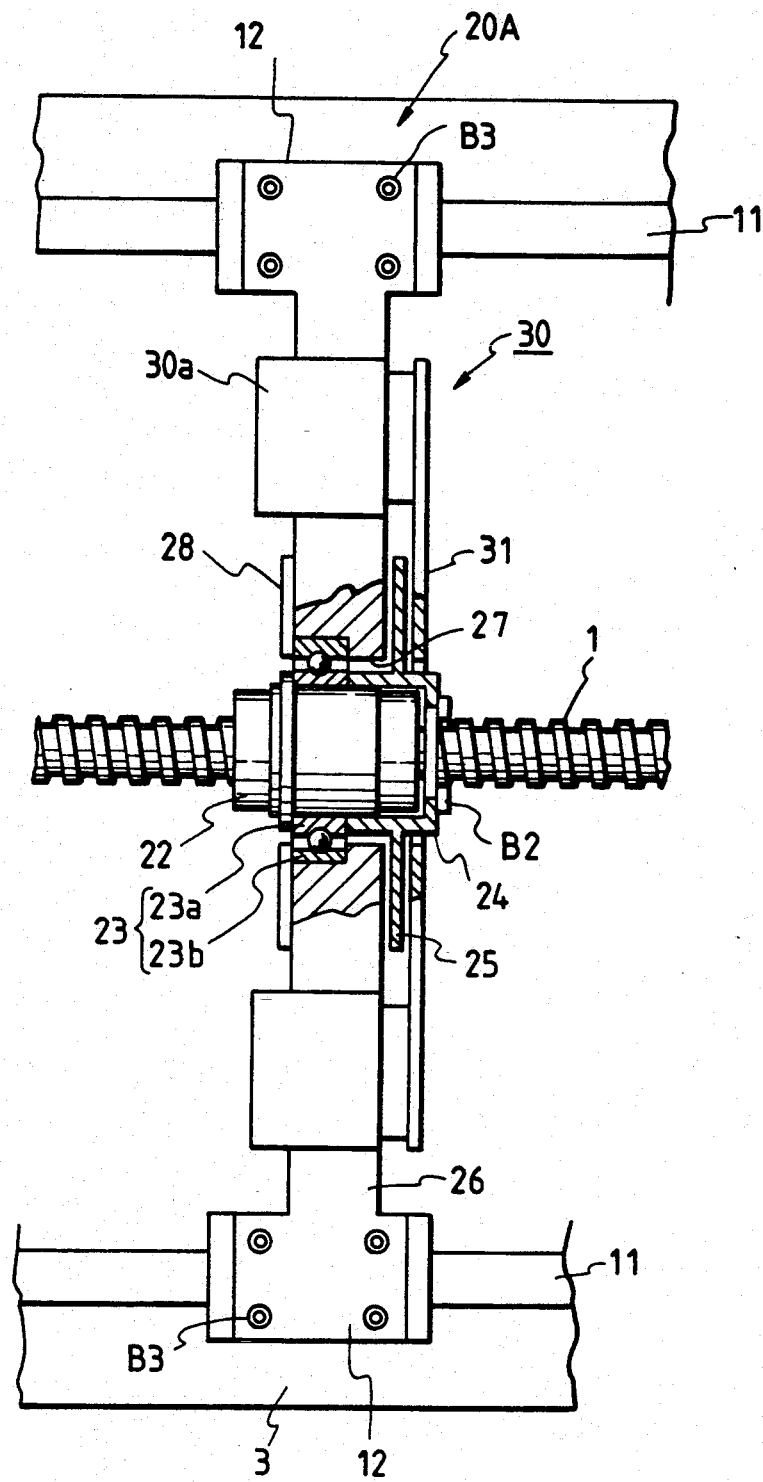
FIG. 2 is an enlarged view of an important portion of FIG. 1.

FIG. 1 is a plan view of a table feed apparatus equipped with intermediate support devices for a screw shaft according to a preferred embodiment of the present invention (The showing of a table is omitted). FIG. 2 is an enlarged view of an important portion of the apparatus.

In the drawings, reference numeral 1 denotes a screw shaft of a ball screw, and reference numeral 2 denotes a nut of the ball screw threadedly engaged with the screw shaft 1. The opposite end portions of the screw shaft 1 are rotatably supported respectively by bearings 5 of two fixed bearing units 4 and 4 fixedly mounted on a bed 3. One end of this screw shaft is connected to a motor M via a coupling 6. The nut 2 is attached to the table 8 through a nut housing 7. The opposite (right and left) side portions (spaced from each other in a direction perpendicular to the direction of movement of the table) of the table 8 are supported respectively by a pair of linear guide devices 10 mounted on the bed 3 in parallel relation to the screw shaft 1.

Figure 3:
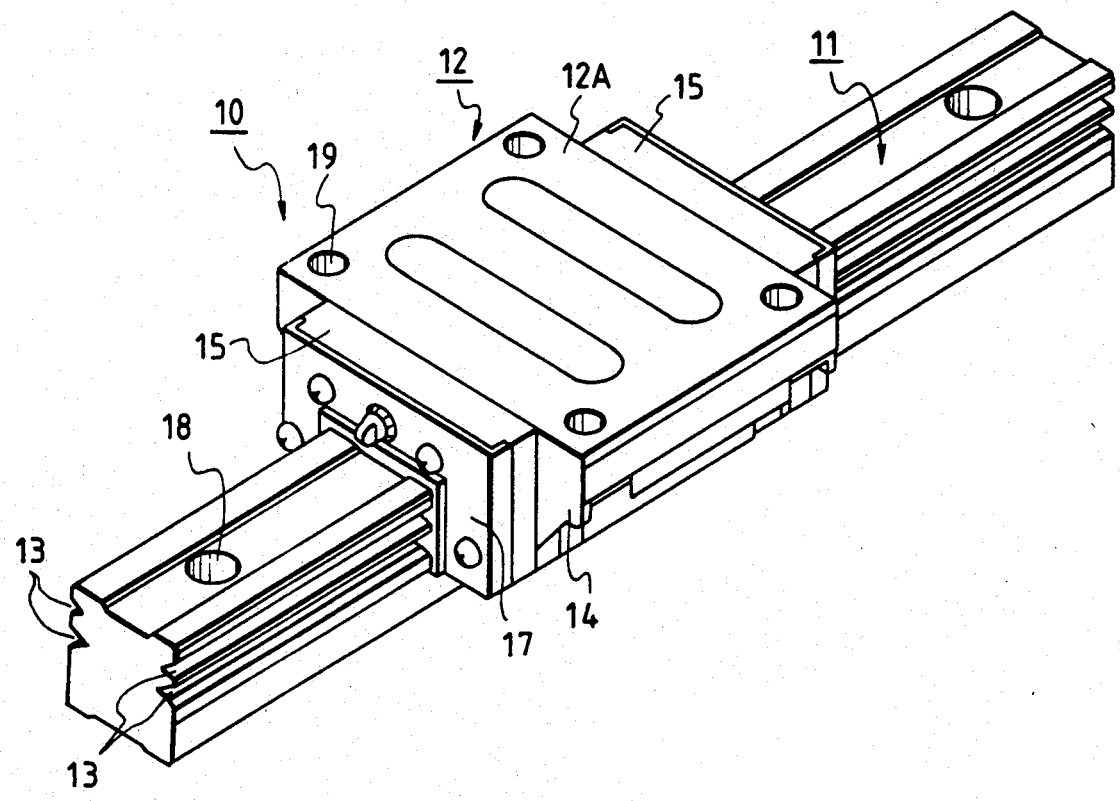
FIG. 3 is a perspective view of a linear guide device shown in FIG. 1.

As shown in FIG. 3, the linear guide device 10 includes a guide rail 11 extending in the axial direction, and sliders 12 (only one of which is shown in FIG. 3) movably mounted on this guide rail in a straddling manner. Ball-rolling grooves 13 are formed in each of the opposite side surfaces of the guide rail 11, and extend in the axial direction of the guide rail. Ball-rolling grooves (not shown) opposed respectively to the ball-rolling grooves 13 are formed in an inner surface of each of legs 14 of a slider body 12A of the slider 12. A number of balls are rollingly received in each pair of opposed ball-rolling grooves mentioned above, and the slider 12 smoothly moves on the guide rail 11 in the axial direction through the rolling of the balls. As is well known, in accordance with the movement of the slider 12, the balls circulate through an endless ball-circulating passageway formed in the interior of the slider 12.

The guide rail 11 of the linear guide device 10 is fixedly secured to the bed 3 by bolts passing respectively through bolt insertion holes 18 provided between the bearing housings 4 and 4 mounted respectively on the opposite ends of the screw shaft 1. The pair of guide rails 11 are disposed parallel to the screw shaft 1. Four sliders 12 are mounted astride each of the guide rails 11 and 11 (that is, eight sliders 12 in all). Four out of these sliders 12 are fixedly secured respectively to four corners of the lower surface of the table 8 by bolts B1 passing through bolt holes 19, and prevent the table 8 from shaking in upward, downward, right and left directions relative to the direction of movement of the table.

On the other hand, a pair of intermediate support devices 20A and 20B for receiving the radial load of the screw shaft 1 are mounted on the upper surfaces of the outer sliders 12. Namely, the table 8 and the intermediate support devices 20A and 20B are mounted on the common guide rails 11 through the sliders 12 so as to move along these guide rails. In this embodiment, the intermediate support devices 20A and 20B are disposed respectively on the opposite (front and rear) sides of the table 8, connected to the nut 2, in the axial direction, and are connected together by connecting rods 21 so as to move in unison with each other.

The intermediate support devices 20A and 20B will now be described in more detail with reference to FIGS. 1 and 2. The two are of the same construction, and therefore only one of them, that is, the intermediate support device 20A, will be described.

A nut 22 similar to the above-mentioned nut 2 is threadedly engaged with the screw shaft 1 of the ball screw through balls (not shown). A ball bearing (rolling bearing) 23 is fitted on an outer periphery of a body of the nut 22. An inner race 23a of this bearing is fixed to the nut 22 by an inner race holder 24 of a cylindrical shape fitted on and fixed by bolts B2 to the nut 22. A radially-projecting, disk-shaped fixed brake shoe 25 is formed coaxially on a peripheral surface of the inner race holder 24.

An outer race 23b of the ball bearing 23 is fitted in an inner peripheral surface of a nut insertion hole 27 formed through a central portion of a connecting member 26 extending between the two guide rails 11 and 11, and is fixed by an outer race holder plate 28. Thus, the nut 22 is rotatably connected to and supported by the connecting member 26 through the ball bearing 23. One end of the connecting member 26 is fixedly secured by bolts B3 to the upper surface of the outer slider 12 mounted astride one guide rail 11. The other end thereof is fixedly secured by bolts B3 to the upper surface of the outer slider 12 on the other guide rail 11. The connecting member 26, which interconnects the two opposed sliders 12 between which the screw shaft 1 is disposed, has a pair of brake devices 30 which are disposed respectively on the opposite sides of the nut 22. The brake device 30 comprises an electromagnetic brake body 30a fixedly mounted on the connecting member 26, and a movable brake shoe 31 for movement back and forth in the axial direction in response to the on-off operation of the electromagnetic brake body 30a. The movable brake shoe 31 is disposed in opposed relation to the fixed brake shoe 25. The electromagnetic brake body 30a is energized to attract the movable brake shoe 31 to press the same against the fixed brake shoe 25 to thereby prevent a free rotation of the nut 22.

As shown in FIG. 1, shock absorbers 35 each using a piston cylinder are provided respectively at the opposite (right and left) end portions of the bed 3, thereby preventing the intermediate supports 20A and 20B from impinging on the respective bearing units 4. Shock absorbers 36 are fixedly mounted on the lower surface of the table 8, and are disposed in opposed relation to the shock absorbers 35, respectively.

The operation will now be described.

The machine table 8 and the intermediate supports 20A and 20B are guided through the common guide rails 11 of the linear guide devices 10, and therefore for mounting the feed screw apparatus, it is only necessary to effect the centering of the guide rails 11 relative to the screw shaft 1, and therefore the operation can be carried out very easily.

For operating the apparatus, the motor M is energized to drive the screw shaft 1 for rotation in the normal (or the reverse) direction. In accordance with its rotational direction, the nut 2 is moved in a predetermined axial direction (for example, the left (or right) direction in FIG. 1), so that the machine table 8 is guided at its opposite sides by the linear guide devices 10 and 10 to smoothly move linearly. At this time, if the distance L between the support points of the screw shaft 1 is long, the value of the critical speed which is inversely proportional to the value of $L^2$ is small, and therefore there is a risk that the screw shaft 1 may be subjected to resonance at relatively low speed. In this embodiment, however, the intermediate portion of the screw shaft 1 is supported by the intermediate supports 20A and 20B, and therefore the distance between the support points is reduced to greatly increase the critical speed. As a result, even if the screw shaft 1 rotates at high speed, the screw shaft 1 is hardly subjected to resonance.

In the prior art, the table 8 continues to move left in FIG. 1, and when the nut 2 is abutted against the left intermediate support, the table 8 thereafter moves left together with the intermediate supports interconnected by the connecting rod. Therefore, the high-speed movement of the table 8 has been prevented by the intermediate supports.

On the other hand, in this embodiment, the intermediate supports 20A and 20B can be moved in accordance with the movement of the table 8. And besides, the movement thereof can be controlled arbitrarily. Namely, when the electromagnetic brake body 30a of each of the intermediate supports 20A and 20B is energized, the movable brake shoe 31 is attracted to be pressed against the fixed brake shoe 25, thereby restraining the free rotation of the nut 22. When the screw shaft 1 is rotated in this restrained condition of the nut 22, the nut 22 is moved, so that the intermediate support 20A, 20B is guided by the guide rails 11 to move smoothly. When the electromagnetic brake body 30a is de-energized, the movable brake shoe 31 is returned to a release position by a restoring force of a spring (not shown), so that the engagement thereof with the fixed brake shoe 25 is released. In this released condition, the nut 22 supported by the ball bearing 23 can rotate freely, and will not move even when the screw shaft 1 rotates.

By thus restraining and allowing the rotation of the nut 22 through the on-off operation of the brake device 30, the movement and stop of the intermediate support 20A, 20B can be controlled in a desired manner, and during the movement of the table 8 (that is, during the rotation of the screw shaft 1), the optimal portions of the screw shaft 1 intermediate the opposite ends thereof can be supported.

In this embodiment, the two intermediate supports 20A and 20B are connected together by the connecting rods 21, and the two can be operated in a synchronizing manner by controlling only one of the intermediate supports. The purposes of using the connecting rods 21 are (1) to eliminate a fine deviation of each intermediate support 20A, 20B in the brake-deactivated condition by the interconnection of the two intermediate supports, and (2) to mechanically set the distance between the intermediate supports 20A and 20B and the stroke.

The two intermediate supports 20A and 20B may not always be interconnected by the connecting rods 21. In such a case, the intermediate supports 20A and 20B are controlled independently of each other.

Although the two intermediate supports 20A and 20B are provided respectively on the front and rear sides of the table 8, only one of them may be provided depending on the length of the screw shaft 1, as well as the manner of supporting the opposite ends of the screw shaft 1.

If necessary, the brake devices 30 may be always in a released condition, in which case for moving the intermediate supports 20A and 20B, the shock absorbers 36 mounted on the table 8 are abutted against the intermediate supports 20A and 20B to move the intermediate supports 20A and 20B by moving the table 8.

Although the opposite (right and left) ends of each of the intermediate supports 20A and 20B are connected respectively to the sliders 12 of the two linear guide devices, the intermediate support may not be fixedly connected to these sliders, but the intermediate support may connected between the nut 22 and the slider 12 of one linear guide device.

In the brake device of the present invention, the movable brake shoe 31 may be frictionally and slidably brought in contact with the fixed brake shoe 25 in an initial operation of the brake device, and then strongly engaged with the same so as to prevent a free rotation of the nut 22 supporting the intermediate portion of the screw shaft without having a big shock. Thereby, the operation of the intermediate support device can be conducted smoothly.

As described above, in the present invention, the intermediate support devices for the screw shaft are controlled to operate in the axial direction of the screw shaft, and therefore can be moved in a desired manner to support the optimal portions of the screw shaft, without preventing the high-speed movement of the table, thereby increasing the natural frequency of the screw shaft.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An intermediate support device for a screw shaft comprising:
   a nut threadedly engaged with a screw shaft which is rotatably supported at opposite ends thereof;
   a pair of linear movement guiding members extending parallel to said screw shaft, each of said linear movement guiding members having a slider;
   a connecting member interconnecting said sliders and said nut, said connecting member rotatably supporting said nut through a rolling bearing; and
   a braking means mounted on said connecting member for restraining the rotation of said nut.

2. An intermediate support device for a screw shaft according to claim 1, in which said braking means comprises:
   a first brake member mounted on the outer surface of said nut;
   an electromagnetic brake body fixedly mounted on said connecting means; and
   a second brake member disposed to confront said first brake member so as to contact with said first brake member in response to the on-off operation of said electromagnetic brake body.

3. An intermediate support device for a screw shaft according to claim 1, in which
   said rolling bearing comprises;
      an inner race mounted on an outer surface of said nut,
      an outer race connected to a bar member coupled with said slider, and
      a rolling element disposed between said inner and outer races, and
   said braking means comprises;

a first brake member mounted on the outer surface of said nut, an electromagnetic brake body fixedly mounted on said bar member of said connecting means, and a second brake member disposed to confront said first brake member so as to contact with said first brake member in response to the on-off operation of said electromagnetic brake body.

4. A table feed device comprising:

a pair of guide rails supported on a bed;

a screw shaft rotatably supported at opposite ends thereof and extending in parallel with said guide rails;

a first nut threadedly engaged with said screw shaft;

a table mounted on said first nut and movable in an axial direction of said screw shaft; and An intermediate support means for supporting an intermediate portion between said both opposite ends of said screw shaft, said intermediate support means comprising;

a second nut threadedly engaged with said screw shaft which is rotatably supported at opposite ends thereof;

a pair of sliders mounted on said guide rails, respectively;

a connecting member interconnecting said sliders and said second nut, said connecting member rotatably supporting said second nut through a rolling bearing; and a braking means mounted on said connecting member for restraining the rotation of said second nut.

5. A table feed device according to claim 4, in which said braking means comprises:

a first brake member mounted on the outer surface of said second nut;

an electromagnetic brake body fixedly mounted on said connecting means; and a second brake member disposed to confront said first brake member so as to contact with said first brake member in response to the on-off operation of said electromagnetic brake body.

6. An intermediate support device for a screw shaft according to claim 4, in which said rolling bearing comprises;

an inner race mounted on an outer surface of said second nut, an outer race connected to a bar member coupled with said slider, and a rolling element disposed between said inner and outer races, and said braking means comprises;

a first brake member mounted on the outer surface of said second nut, an electromagnetic brake body fixedly mounted on said bar member of said connecting means, and a second brake member disposed to confront said first brake member so as to contact with said first brake member in response to the on-off operation of said a electromagnetic brake body.

* * * * *